Figure 1:
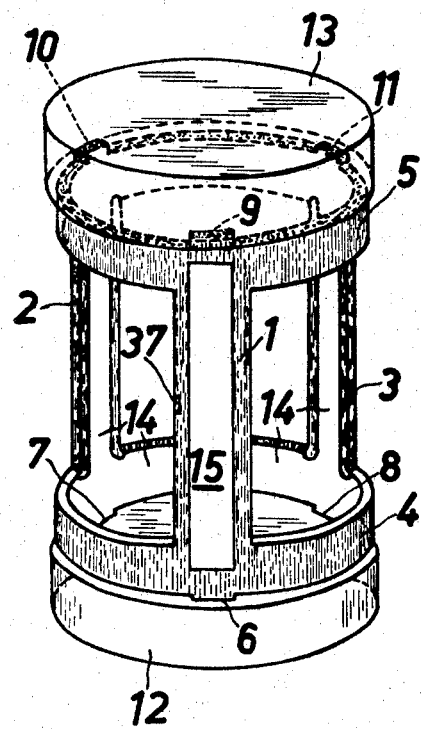

June 11, 1968          G. HESSE          3,387,531
DEVICES FOR SUPPORTING, ADJUSTING AND DISPLACING AT
LEAST ONE OF TWO OPTICAL PLATES LOCATED ACCORDING
TO THE FABRY-PEROT PRINCIPLE Filed Nov. 5, 1964

Inventor

3,387,531
DEVICES FOR SUPPORTING, ADJUSTING AND DISPLACING AT LEAST ONE OF TWO OPTICAL PLATES LOCATED ACCORDING TO THE FABRY-PEROT PRINCIPLE
Gerhard Hesse, Jena, Germany, assignor to VEB Carl Zeiss Jena, Jena, Germany
Filed Nov. 5, 1964, Ser. No. 409,330
3 Claims. (Cl. 88—14)

This invention relates to a device in the form of an open prismatic hollow body for supporting and electromechanically adjusting and displacing at least one of two optical plates located according to the Fabry-Perot principle.

Quick-registering Fabry-Perot interferometers are known in which the interval between the plates is changed in a magnetostrictive or an electrostrictive way by means of suitable oscillators. In consequence of inherent inertness, the Fabry-Perot plates are subject to inflections and the instrumental function of such interferometers is incontrollably altered. Strictly speaking, a change in the spacing of the plates is temporarily constant only in the immediate neighbourhood of the position of equilibrium. Part of the oscillation energy is transformed into heat by the internal friction and causes a change in the length of the plate carrier and hence a change in the intervening space of the Fabry-Perot plates. These disturbing factors go to increase the unreliability of the measurements obtained by such interferometers, which are thus restricted to use in routine work. Spectroscopic and meteorologic precision measurements require interferometers of much greater measuring accuracy with possibilities of recognizing and ruling out any such disturbances.

In a known Laser device, each Fabry-Perot plate is urged against a carrier plate by means of three elastic clamps, and the carrier plates are connected to each other by being screwed to four magnetostrictive rods. Mechanical connection of these parts has the inherent disadvantage to give rise to intermediate air-cushions and other mechanical disturbance factors detrimental to the accuracy and consistency indispensable in high-precision measurement.

The present invention aims at obviating the foregoing disadvantages by providing a device for supporting, adjusting and displacing Fabry-Perot plates which is oscillation-free and in which there are no mechanical holding means between the electromechanically changeable parts and the Fabry-Perot plate or plates.

To this end, the present invention accordingly consists in a device in the form of an open prismatic hollow body for supporting and electromechanically adjusting and displacing at least one of two optical plates located according to the Fabry-Perot principle, characterized in that the hollow body is so formed that it is constituted by two ring shaped ends interconnected by webs which are parallel to the generatrix of the body and which are considerably narrower than spaces left between the webs, electrically conductive layers being provided on the inside and outside of the webs, and the two end rims of the hollow body having projections constituted by extension of the webs to provide surfaces for supporting the plates. The conductive layers on the inner web surfaces are preferably in direct mutual connection, whereas the conductive layers on the outer web surfaces are preferably insulated from each other.

The device according to the invention can be used also as reference standard between two Fabry-Perot plates. In any case, the device is of insulating material, for instance ceramics, which an electric field causes to change its length at allotted places, this deformation being parallel to the generatrix of the hollow body.

The stability and rigidity of the device according to the invention is particularly great if the hollow body is a cylinder which can mathematically be considered as the limiting case of a prism.

The Fabry-Perot plates have the best possible support and in a simple way receive well defined displacements if the cylindrical surface is cut open to leave three webs displaced 120° relatively to each other and the outer rims of the hollow body provide three corresponding supporting surfaces of but small dimensions. To the avoidance of mechanical holding means between the electrostrictive hollow body and the Fabry-Perot plates, these plates are sprung on the holding means.

The plates located according to the Fabry-Perot principle may be plane, spherical or aspherical.

Moreover, it is advantageous to provide in the device according to the invention at least one highly sensitive temperature gauge for recording and, if so desired, automatic reaction to temperature variations.

The device according to the invention can be used whenever measurements must be made with utmost precision and maximum coherence lengths are desired. It can be used to particular advantage in highly resolving spectrometers, in Raman spectroscopy, as a Laser resonator with electrostrictive adjustment and compensation of thermally and mechanically conditioned changes in the space between the Fabry-Perot plates, or as an optical filter for extremely monochromatic radiation with defined wavelength concentration point.

Figure 2:
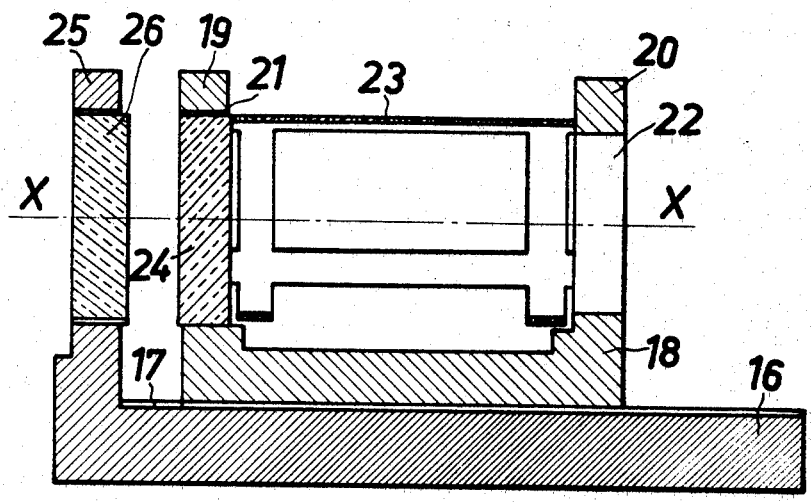
Figure 3:
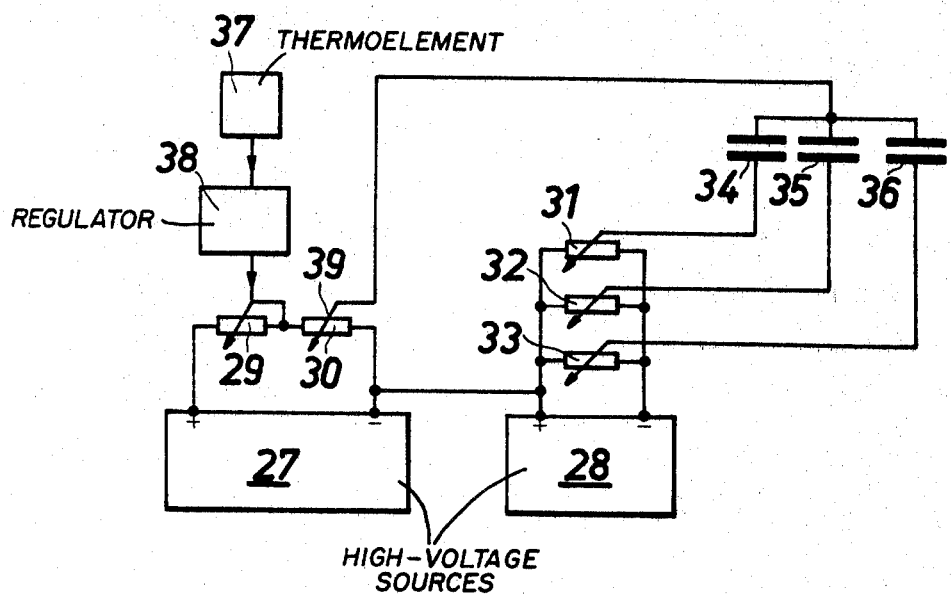

In order that the invention may be more readily understood, reference is made to the accompanying drawings which illustrate schematically and by way of example the embodiment of a device according to the invention for supporting, adjusting and displacing at least one of two optical plates located according to the Fabry-Perot principle, and in which FIG. 1 is a perspective side view of the device according to the invention, used as a reference standard;

FIG. 2 shows the device according to the invention in sectional side elevation, for supporting a Fabry-Perot plate, and FIG. 3 is a switching diagram illustrating the electromechanic influence on the device according to the invention.

In FIG. 1, a cylindrical hollow body of piezoelectric ceramics consists of two rings 4 and 5 interconnected by three webs 1, 2 and 3. In the web 1 is embedded a thermoelement 37. The rings 4 and 5 have respectively outer extensions 6, 7, 8 and 9, 10, 11, preferably of equal length, which are extensions of the webs 1, 2 and 3. The bearing areas of these extensions lie in planes at least approximately at right angles to the geometric cylinder axis. On the bearing areas of the projections 6, 7, 8 and 9, 10, 11 are sprung Fabry-Perot plates 12 and 13, respectively. If necessary, the Fabry-Perot plates can be secured by caps held in place by spiral springs (not shown). The interior cylinder wall is coated with an electrically conductive layer 14 and the exterior walls of the webs 1, 2, 3 are covered by a layer 15 of good electrically conductive material, the three parts of the layer 15 on the webs 1, 2, 3, respectively, being insulated one from another. For the sake of clarity, FIG. 1 shows only that part of the layer 15 which covers web 1.

By applying different voltages to the parts of the layer 15 on webs 1, 2 and 3 it is possible for adjusting purposes to produce different changes in the length of the webs and, accordingly, a change of the angle which the Fabry-Perot plates 12 and 13 subtend. Moreover, by applying the same voltage to all three parts of the layer 15 it is possible to vary the distance apart of the Fabry-Perot plates 12 and 13 without the said subtended angle being varied. By suitably dimensioning the cylindrical hollow body, the change of the spacing between the Fabry-Perot plates may be made a multiple of the wave lengths of the visible spectral region.

In FIG. 2, a base 16 has a guide 17 for displacement of a slide 18 to which are fixed two bearings 19 and 20 substantially parallel to each other and at right angles to the guide 17. The bearings 19 and 20 have apertures 21 and 22, respectively. Between the bearings 19 and 20 is a cylindrical hollow body 23 of the kind described with reference to FIG. 1, the one end of the body 23 being so cemented to the bearing 20 that its geometrical axis X—X is in alignment with the centers of the apertures 21 and 22. On the other end of the body 23 is sprung a Fabry-Perot plate 24 which can slide in the aperture 21 of the bearing 19. A mount 25, the center of which lies in the geometrical axis X—X, and which is fast with the base 16, contains a Fabry-Perot plate 26, the plate 26 being thus rigidly connected to the base 16. The device illustrated in FIG. 2 is to be considered as part of an interferometer having a continuously changeable dispersion area.

In FIG. 3, two ungrounded electronically stabilized high-voltage sources 27 and 28 supply current respectively to two series-connected potentiometers 29, 30 and three parallel-connected potentiometers 31, 32, 33. The electrically conductive layers on the outer cylindrical surface are designated 34, 35, 36. The electrically conductive layer on the inner cylindrical surface is connected to the slider 39 of the potentiometer 30. In the wall of the cylindrical hollow body 23 is embedded a thermoelement 37 which influences the potentiometer 29 via a regulator 38.

Voltage is supplied through the potentiometers 31, 32, 33 to the conductive layers 34, 35, 36, so that the Fabry-Perot plates 12, 13 and 24, 26 can be adjusted. After adjustment, further voltage (hereinafter called control voltage) is heterodyned on the adjusting voltages via the potentiometer 30. The control voltage uniformly influences the webs 1, 2, 3 and displaces one or both Fabry-Perot plates without varying the angle subtended by these plates, so that changes in the space between the Fabry-Perot plates are created for the linear determination of the various interference orders. If continuous registration of the interference orders is desired, the slider 39 of the potentiometer 30 can be actuated by a synchronous motor (not shown), and, if so required, the velocity of the registration can be adapted to the measuring problem on hand by means of a change gear (not shown).

Temperature variations even of fractions of a centigrade being harmful to good measuring, it is necessary either to stabilize the temperature of the hollow body 23 or, as in the here described embodiment of the invention, to preconsider such variations. In the justified assumption that the temperature variation is the same in all the webs of the hollow body, use is made of only one thermoelement 37. The control potentials of the thermoelement 37 which are required for correcting changes in length due to temperature variation are conducted to the potentiometer 29 through the regulator 38 which potentiometer in a suitable manner changes the control voltage. Changes which occur in the length of the hollow body 23 in consequence of temperature variations are thus electrostrictively compensated.

I claim:

1. A hollow body of electrostrictive material for supporting, adjusting and displacing at least one of two optical plates located according to the Fabry-Perot principle, having two apertures in diametric opposition to each other, at least one of said apertures having before it one of said plates, said body comprising two rings which are interconnected by webs separated by hollow spaces, said webs being considerably narrower than said spaces, one ring near each of said apertures, said webs interconnecting said rings, projections on said rings in prolongation of said webs, said plates being connected with said projections, electrically conductive layers on the inner and outer surfaces of said webs, said layers being electrically insulated from each other by said webs of electrostrictive material, a voltage source electrically connected with said layers, said voltage source being for producing electric potential and accordingly an electric field between the layers of each web, said electric field causing a change in the length of each web between said layers parallel to the generatrices of said hollow body, an electric adjusting means for each web, said electric adjusting means being for differential changes in the potentials of said layers and accordingly for changing the angle enclosed by said plates, and an electric control means for equal changes in the potentials of said layers of all said webs and accordingly for changing of the distances apart of said plates without changes in said angle.

2. A hollow body of electrostrictive material for supporting, adjusting and displacing at least one of two optical plates located according to the Fabry-Perot principle, having two apertures in diametric opposition to each other, at least one of said apertures having before it one of said plates, said body comprising two rings which are interconnected by webs separated by hollow spaces, said webs being considerably narrower than said spaces, one ring near each of said apertures, said webs interconnecting said rings, projections on said rings in prolongation of said webs, said plates being connected with said projections, electrically conductive layers on the inner and outer surfaces of said webs, said layers being electrically insulated from each other by said webs of electrostrictive material, said layers on said inner surfaces being electrically connected with each other, said layers on said outer surfaces being electrically separated from one another, a voltage source electrically connected with said layers, said voltage source being for producing electric potential and accordingly an electric field between the layers of each web, said electric field causing a change in the length of each web between said layers parallel to the generatrices of said hollow body, an electric adjusting means for each web, said electric adjusting means being for differential changes in the potentials of said layers and accordingly for changing the angle enclosed by said plates, and an electric control means for equal changes in the potentials of said layers of all said webs and accordingly for changing of the distances apart of said plates without changes in said angle.

3. A hollow body of electrostrictive material for supporting, adjusting and displacing at least one of two optical plates located according to the Fabry-Perot principle, having two apertures in diametric opposition to each other, at least one of said apertures having before it one of said plates, said body comprising two rings which are interconnected by webs separated by hollow spaces, said webs being considerably narrower than said spaces, one ring near each of said apertures, said webs interconnecting said rings, projections on said rings in prolongation of said webs, said plates being connected with said projections, electrically conductive layers on the inner and outer surfaces of said webs, said layers being electrically insulated from each other by said webs of electrostrictive material, a voltage source electrically connected with said layers, said voltage source being for producing electric potential and accordingly an electric field between the layers of each web, said electric field causing a change in the length of each web between said layers parallel to the generatrices of said hollow body, an electric adjusting means for each web, said electric adjusting means being for differential changes in the potentials of said layers and accordingly for changing the angle enclosed by said plates, an electric control means for equal changes in the potentials of said layers of all said webs and accordingly for changing of the distances apart of said plates without changes in said angle, a further voltage source, at least one temperature responsive member in the surface of said body being electrically connected with the layers on a surface of said webs on the one hand and with said further voltage source on the other.

References Cited

UNITED STATES PATENTS 2,534,846  12/1950  Ambrose et al. _____ 88—14

FOREIGN PATENTS 250,623  3/1964  Australia.
123,329  2/1958  U.S.S.R.

JEWELL H. PEDERSEN, *Primary Examiner.*

JOHN K. CORBIN, *Examiner.*

B. LACOMIS, *Assistant Examiner.*